United States Patent [19]

Byrnes et al.

[11] Patent Number: 5,286,167

[45] Date of Patent: Feb. 15, 1994

[54] SPAR-TO-HUB JOINT FOR A FLEXBEAM HELICOPTER ROTOR

[75] Inventors: Francis E. Byrnes, White Plains, N.Y.; David N. Schmaling, Oxford, Conn.

[73] Assignee: United Technologies Corporation, Hartford, Conn.

[21] Appl. No.: 826,583

[22] Filed: Jan. 27, 1992

Related U.S. Application Data

[63] Continuation-in-part of Ser. No. 530,717, May 30, 1990, abandoned.

[51] Int. Cl.$^5$ .............................................. B64C 27/33
[52] U.S. Cl. .................... 416/134 A; 416/135; 416/141
[58] Field of Search ............... 416/131, 132 R, 134 R, 416/134 A, 135, 141

[56] References Cited

U.S. PATENT DOCUMENTS

| | | | |
|---|---|---|---|
| 2,369,048 | 2/1945 | Hays | 416/134 A X |
| 3,330,362 | 7/1967 | Kastan | 416/132 X |
| 3,476,484 | 7/1968 | Brunsch | 416/230 |
| 3,874,815 | 4/1975 | Baskin | 416/141 X |
| 4,087,203 | 5/1978 | Ferris | 416/134 A X |
| 4,142,833 | 3/1979 | Rybicki et al. | 416/134 A |
| 4,251,309 | 2/1981 | Class et al. | 416/134 A X |
| 4,257,738 | 3/1981 | Schwarz et al. | 416/141 |
| 4,352,631 | 10/1982 | Buchs et al. | 416/141 X |
| 4,360,337 | 11/1982 | Frommlet et al. | 416/141 |
| 4,369,018 | 11/1983 | Brunsch et al. | 416/141 X |
| 4,381,902 | 5/1983 | Head et al. | 416/134 A |
| 4,592,701 | 6/1986 | Hahn et al. | 416/134 A |
| 4,676,720 | 6/1987 | Niwa et al. | 416/134 A |

FOREIGN PATENT DOCUMENTS

| | | | |
|---|---|---|---|
| 0315962 | 5/1989 | European Pat. Off. | |
| 759535 | 1/1953 | Fed. Rep. of Germany | 416/134 R |
| 1380710 | 1/1975 | United Kingdom | 416/134 A |

OTHER PUBLICATIONS

Sikorsky Aircraft, Bearingless Rotor, Aug. 28, 1980.
Development of a Bearingless Helicopter TailRotor, 1981.

*Primary Examiner*—Edward K. Look
*Assistant Examiner*—James A. Larson
*Attorney, Agent, or Firm*—Vernon F. Hauschild

[57] ABSTRACT

A flexbeam helicopter rotor having an improved connection between the flexbeam and the hub of the connecting pin variety but in which the high tensile fibers of the flexbeam do not wrap around the connecting pin, wherein the blade centrifugal loads and the blade lead-lag loads are reacted by the connecting pin at a station where it passes through drilled holes in the flexbeam inner end, and wherein the blade flapping motion imposed loads are reacted through two load paths in the flexbeam-to-hub connection, the first load path being created by a prying reaction between the flexbeam and the hub connecting flanges, and the second load path being created by the differential bending reaction between the flexbeam at the station of the drilled holes and the connecting bolts. Further, there is apparatus to decouple the loads and decrease the maximum load in at least one of the load paths created by the aforementioned prying reaction and the aforementioned bending reaction so that they are substantially spaced along the flexbeam axis of rotation from each other to thereby permit the use of a minimum thickness flexbeam, and gain the attended advantage of reduced rotor weight and size, and which flexbeam-to-hub connection has the additional advantage of a reduced flapping hinge effecting offset, or flapping axis, from the prior art type of connection.

14 Claims, 7 Drawing Sheets

PRYING REACTION

DIFFERENTIAL BENDING REACTION

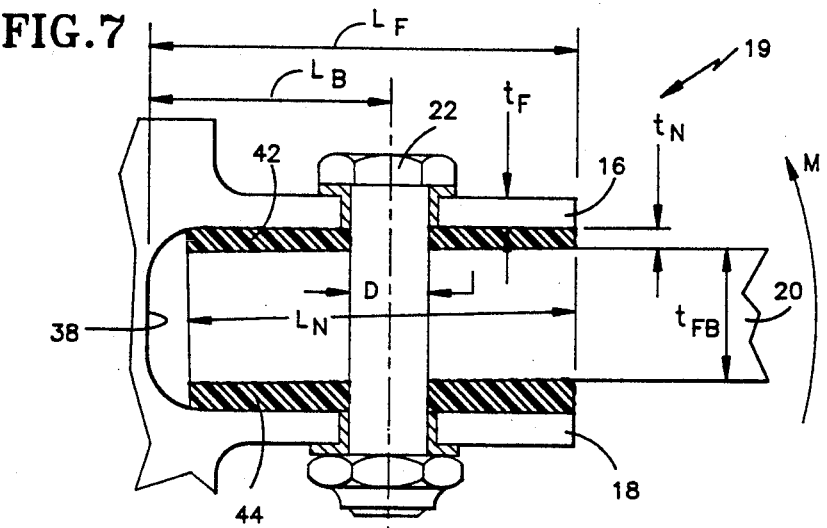
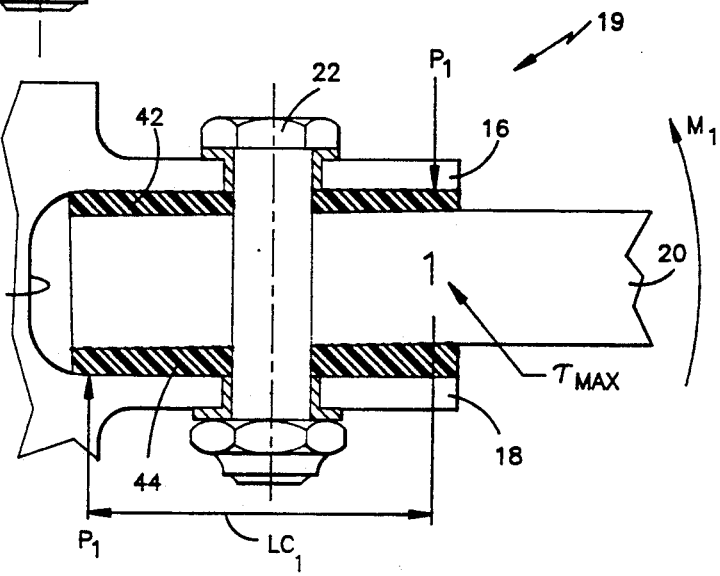
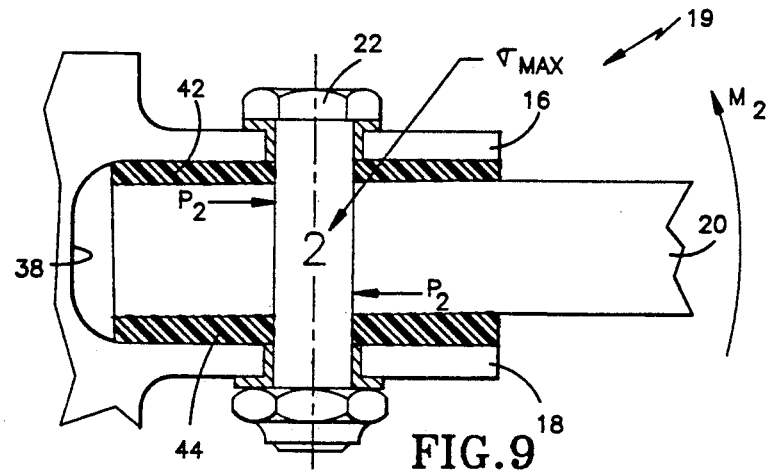

SPAR-TO-HUB JOINT FOR A FLEXBEAM HELICOPTER ROTOR

This is a continuation-in-part of U.S. Ser. No. 530,717 filed May 30, 1990, abandoned.

TECHNICAL FIELD

This invention relates to flexbeam helicopter rotors in which the flexible spar member is connected to the hub through a unique connection which decouples the loads created in the spar and hub due to the prying reaction created between the flexbeam spar member and the hub connecting flanges and the differential bending reaction created between the flexbeam spar member and the connecting pins, to thereby permit the use of a flexible spar member of reduced thickness so as to reduce the overall weight and envelope of the rotor and to also reduce the effective flapping hinge offset and therefore the interlaminar shear stresses created in the flexbeam during blade flapping motion, and to also permit the use of drilled holes through the spar member for ease of manufacture.

BACKGROUND OF THE INVENTION

In flexbeam helicopter rotors, in which the flexible spar member is connected to the rotor hub through connecting pins passing through each, it has been the practice to wrap the high tensile strength fibers of the spar member around the connecting pins to obtain the required strength at that spar-to-hub joint, as shown in U.S. Pat. No. 3,476,484 to Brunsch dated Nov. 4, 1969. This prior art construction, however, has the disadvantage of creating an effective flapping hinge offset in the spar which is a substantial distance from the rotor axis of rotation. This, creates high interlaminar shear stresses within the spar due to a maximized load reaction between the spar and the connecting pins. In the prior art pin-wrap connections, the spar was made higher and thinner at the station where it wrapped around the connecting pin to maintain the high strength fibers in tension. It is further necessary to increase the height of the spar at the station where it wraps around the pin in the pin-wrap construction so as to reduce the thickness of the spar at that station since the stress $K_T$ created in the spar at the wrap-around station is about equal to the outer radius $R_o$ of the spar-wrap section divided by the inner radius $R_i$ of the spar-wrap section, i.e., $K_T \approx R_o/R_i$. Unfortunately, this increased spar root height added to the hinge offset problem. Further, the pin-wrap connection is difficult and expensive to fabricate.

It is also known in the prior art to use resilient pads between the spar and the supporting hub in crossbeam rotors in which there is no pin connection between the spar and the hub. Such pads were used solely for the purpose of preventing chaffing therebetween, and not for the purpose of decoupling blade flapping induced load paths in the spar-to-hub connection, since these dual load paths do not occur in cross-beam rotors. Further, cross-beam helicopter rotors require an even number of blades, and create difficulty in providing required precone and prepitch for optimum operation of the flexbeam, as well as difficulty in replacing a flexbeam.

DISCLOSURE OF THE INVENTION

Therefore, it is an objective of this invention to teach an improved flexspar-to-hub connection in a flexbeam helicopter rotor in which the flexible spar member connects the airfoil shaped blade to the hub through a pin connection which performs the function of reacting both the blade centrifugal loads and inplane loads at the pin connection. The construction also decouples the spar and hub loads created during blade flapping by the prying reaction between the flexible spar and the hib connecting flanges from the differential bending reaction loads imparted to the hub, spar and connecting bolt at the connecting bolt station. This load decoupling permits the use of a thinner flexbeam spar with the attendant advantage of rotor weight and size reduction, and the additional advantage of a reduction in rotor vibration and resulting stresses brought about by a reduced effective flapping axis.

It is a further object of this invention to teach such a spar-to-hub connection in which the holes through the spar which receive the connecting pins are drilled holes for ease of manufacture, and in which in one embodiment they are two in number so as to permit folding of the blade with one connecting bolt removed.

It is a further feature of this invention that the decoupling of these two blade flapping induced loads results from coaction between the flexible spar member, the hub retaining flanges, and resilient pads positioned therebetween.

BRIEF DESCRIPTION OF THE DRAWINGS

FIG. 7 is a schematic representation of a two-connecting pin, single-row embodiment of our improved spar-to-hub connection to establish parameters and dimensions for use in connection with the description thereof and its operation.

FIG. 8 is a schematic representation of a two-connecting pin, single-row embodiment of our improved spar-to-hub joint used to establish parameters and dimensions to demonstrate the prying reaction which takes place in the joint due to blade flapping motion.

FIG. 9 is a schematic representation of our improved spar-to-hub connection used to establish data and parameters necessary to explain the differential bending reaction which occurs thereacross during blade flapping motion.

BEST MODES FOR CARRYING OUT THE INVENTION

Figure 1:
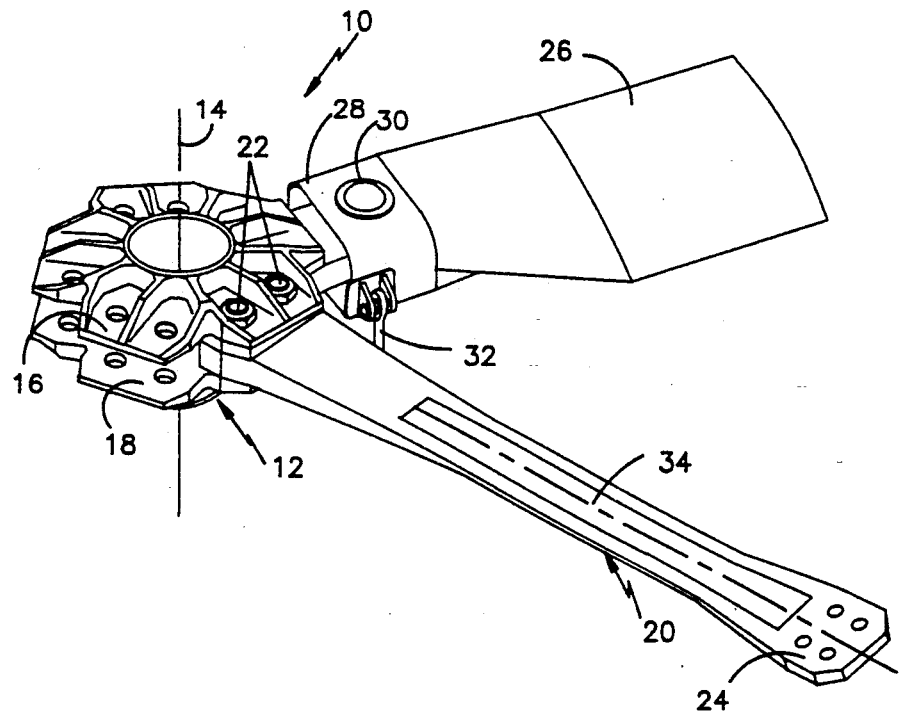
FIG. 1 is a partial showing, partially broken away, of a flexbeam helicopter rotor utilizing our improved spar-to-hub connection.

FIG. 1 is a partial showing, partially broken away, of a hingeless flexbeam helicopter rotor 10 including hub member 12 mounted on a conventional drive shaft for rotation about an axis of rotation 14. Hub 12 comprising a vertically spaced top and bottom connecting flanges 16 and 18 to which the flexbeam or spar member 20 is connected through two connecting bolts or pins 22 which are arranged in a single row at equal radial distance from the axis of rotation 14. The outer end of flexible spar member 20 is connected through conventional connecting means, such as connecting bolts at station 24 to the airfoil blade 26 so that the blade 26 rotates with spar member 20 and hub 12 about axis of rotation 14 during rotor operation. In addition, torque tube 28 is connected to spar member 20 through snubber bearing 30 so as to impart pitch change loads and hence pitch change motion thereto and to blade 26 by action of pitch control rods 32 which cause flexbeam and hence blade 26 to flex about pitch change axis 34. Spar 20 and blade 26 also move in-plane, lead-lag motion. Of particular importance with respect to the present invention, the spar 20 and blade 26 also move out of plane in a flapping motion.

Figure 2:
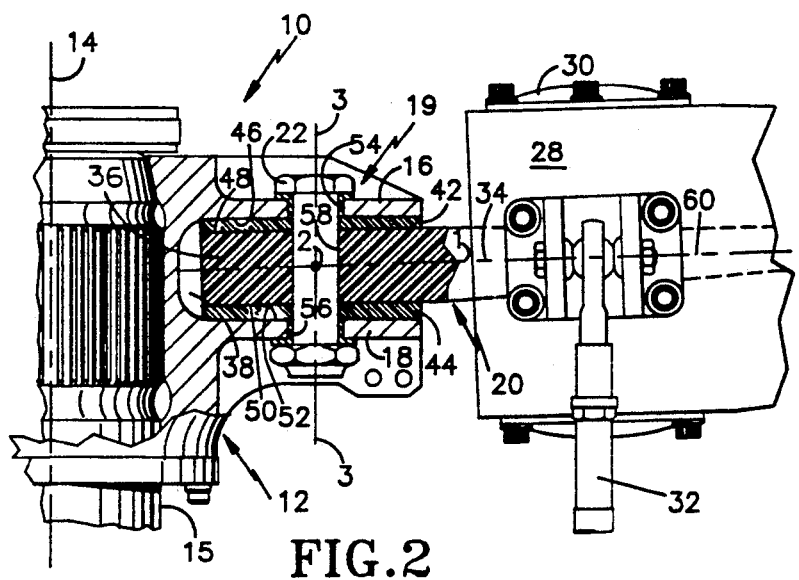
FIG. 2 is a cross-sectional showing of our improved spar-to-hub connection taken through one of the connecting pins.

Our improved spar-to-hub connection or joint 19 is shown in greater particularity in FIG. 2 wherein it will be noted that the radially inner end 36 of spar 20 is received in the clevis 38 formed between flanges 16 and 18 and hub 12 which is driven by drive shaft 15. By viewing FIG. 2, it will be noted that spar-to-hub connection or joint 19 includes upper and lower flange members 16 and 18 of hub 12, the inner end 36 of spar 20, connecting bolts 22, only one of two being shown in FIG. 2, and resilient pads 42 and 44. Pads 42 and 44 are made of resilient material having a tensile or compressive modulus of about 500,000 psi, such as Nylon (Registered trademark of E. I. Dupont). Pad 42 is sandwiched between inner surface 46 of flange 16 and top surface 48 of spar 20, while pad 44 is sandwiched between bottom surface 50 of spar 20 and inner surface 52 of flange 18. Connecting bolts 22 extend through aligned holes 54 in flange 16, 56 in flange 18, and 58 in spar 20.

Spar 20, as shown in FIG. 1, is an elongated and flexible spar member which is preferably fabricated from a plurality of unidirectional, parallelly extending high tensile strength fiber members which are bonded together by epoxy resin during the manufacturing process to produce a spar member which is flexible about a flapping axis 60, which is torsionally movable about pitch change axis 34, and which is stiff in lead-lag, inplane motion of the blade.

In view of the load decoupling and maximum load reduction function which our improved spar-to-hub joint performs, and since it is not necessary to use pin-wrap prior art construction of the type shown in U.S. Pat. No. 3,476,484, spar 20 can be fabricated of minimum height between surfaces 48 and 50 thereby not only reducing rotor weight and size, but also reducing the flexbeam effective flapping axis offset.

Figure 3:
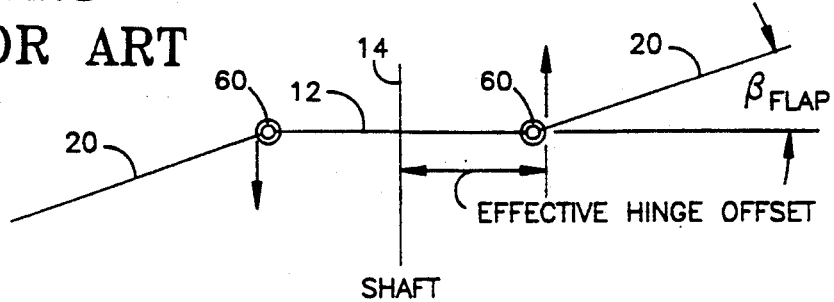
FIG. 3 is a schematic representation of a fixed hinge helicopter rotor to demonstrate its effective hinge offset.
Figure 4:
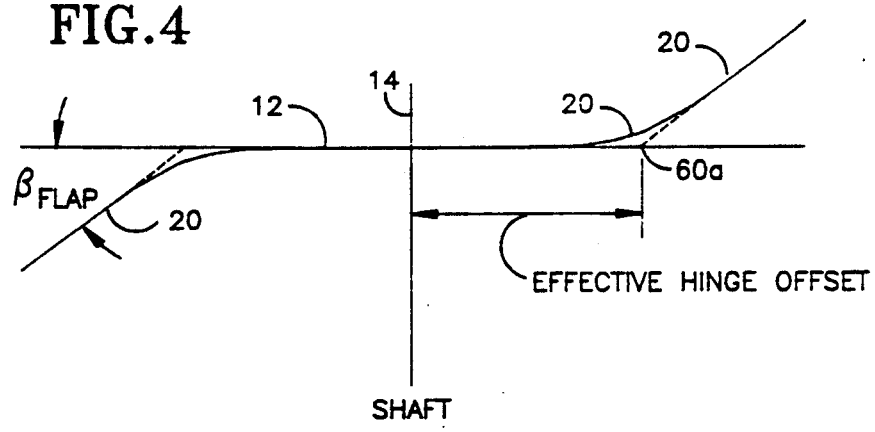
FIG. 4 is a schematic representation of a flexbeam or flexible spar helicopter rotor to demonstrate its effective hinge of flapping axis offset.

The benefit to be gained by our improved spar-to-hub joint in reducing the effective hinge or flapping axis offset will be understood by viewing FIGS. 3 and 4.

FIG. 3 is a schematic showing of a typical articulated elastomeric bearing type helicopter rotor of the type shown in Rybicki U.S. Pat. No. 3,759,631, in which the effective hinge offset or flapping axis 60 is determined by the hardware of the system, and blades 26 therefore flap about a specifically defined flapping hinge or axis 60.

In the flexbeam rotor construction shown in FIG. 4, there is no such articulating bearing. The bending motion of the flexbeam 20 in a flapping direction is caused by the flapping motion of blades 26. It will be noted that there is substantial bending of flexbeam 20 at its station near hub 12, thereby establishing substantial interlaminar shear stress therewithin. It will further be noted that the flexbeam becomes straight due to the high centrifugal force acting thereon at its radially outer stations. In the flexbeam rotor construction of FIG. 4, we can extend the radially outboard, or straight section, of flexbeam 20 toward axis 14 to establish its effective hinge offset or flapping axis at point 60a. It will be noted by comparing FIGS. 3 and 4, that a substantially greater effective hinge offset is experienced in the flexbeam rotor than that experienced in the articulated FIG. 3 construction.

There is advantage to be gained by minimizing the hinge offset because aerodynamic loading of the blade during rotor operation results in a vibration shear loading of the spar. The amount of vibration experienced by the spar increases with increases in effective hinge offset since the amount of hinge offset coacts with the blade aerodynamic loading to create a moment, i.e., blade aerodynamic load x effective hinge offset, which produces a vibration moment in the helicopter. In the prior art pin-wrap spar-to-hub connection, the height of the pin-wrap spar was such that it produced an excessively large effective hinge offset, and hence excessively large spar vibration due to this large effective hinge offset. An advantage of our improved spar-to-hub joint shown in FIG. 2, and to be described hereinafter, is that the decoupling of loads at spar-to-hub joint 19 permits the use of a thinner spar. This results in a reduced effective hinge offset, or distance between flapping axis 60 and axis of rotation 14, to thereby reduce spar vibration accordingly.

Also, because of the blade load decoupling which our improved joint effects, the amount of flapwise moment to be carried at the spar-to-connecting bolt connection station can be reduced and therefore the pin-wrap construction of the prior art is not needed and a spar of lesser height can be used. This also provides an ease of manufacture advantage to our invention in that spar holes 58 can be drilled as a machining operation. This hole drilling advantage would not be possible were it not for the load decoupling function performed by our improved spar-to-hub joint.

To understand the loads which must be reacted by spar-to-hub joint 19, reference will now be made to FIGS. 5 and 6. As rotor assembly 10 rotates about axis of rotation 14, centrifugal loads are generated in blade 26 which are transmitted to spar 20 and which must be reacted at joint 19 by the connecting bolt 22 interconnection between spar 20 and hub flanges 16 and 18. Similarly, as blade 26 and hence spar 20 move in lead-lag, in-plane motion, the loads created by such motion must be similarly reacted at joint 19 between spar 20 and hub flanges 16 and 18 through connecting bolt 22.

In addition to the aforementioned centrifugal loads and lead-lag loads, joint 19 must also react the loads imposed thereon by the flapping motion about flapping axis 60 of blade 26 and spar 20. Our investigation of the loads imposed upon joint 19 by blade and spar flapping motion revealed, quite unexpectedly, that the blade flapping motion is reacted at joint 19 by two different reactions in the joint, namely, the prying reaction shown in FIG. 5 and the differential bending reaction shown in FIG. 6, and the prying reaction and the differential bending reaction produce loads in joint 19 which follow two different load paths.

Figure 5:
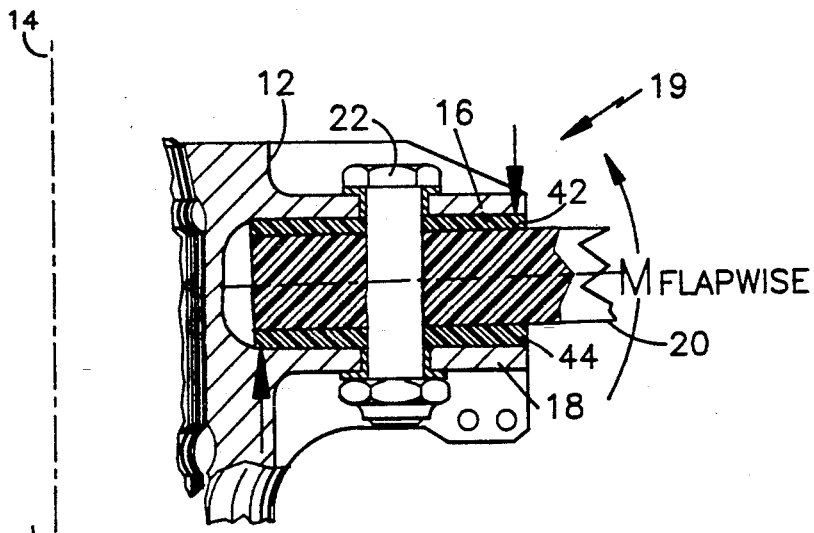
FIG. 5 is similar to FIG. 2 in that it is a showing through the connecting pin connection of our improved spar-to-hub joint and illustrates the prying reaction through the joint created by blade flapping motion.

First considering the prying reaction shown in FIG. 5, this occurs during blade flapping motion and this prying reaction creates a substantial loading depicted as arrows at the outboard end of flanges 16 and 18 and at the inboard end of spar 20 between the spar and the hub flanges. This prying reaction in joint 19 can best be appreciated if we visualize the FIG. 5 joint 19 as having a very loose connection at connecting bolts 22. The end result would therefore be that the flapping loads are taken entirely by the prying reaction. Such a construction would result in maximum interlaminar shear stress in the flexbeam, maximum hub flange bending stresses, but minimum bolt diameter and flexbeam bolt hole stresses. This is obviously not an optimal design.

Figure 5A:
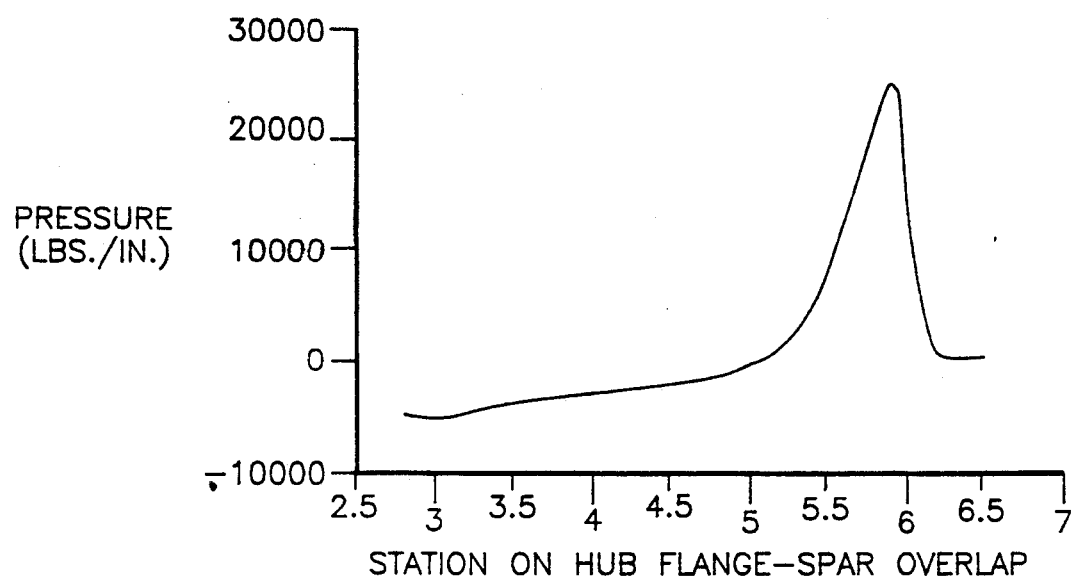
FIG. 5A is a graph showing the pressure in pounds per square inch generated by the prying reaction illustrated in FIG. 5 at various stations along the area of overlap between the rotor hub flanges and the flexbeam spar.

Our investigation revealed that as best shown in FIG. 5a, the degree of load imposed on joint 19 due to this prying reaction is maximum very close to the outboard end of hub flanges 16 and 18 and reduces, in fact reverses, to a load in a different direction, but of lesser magnitude, at the inboard end of the spar-hub flange overlap.

Figure 5B:
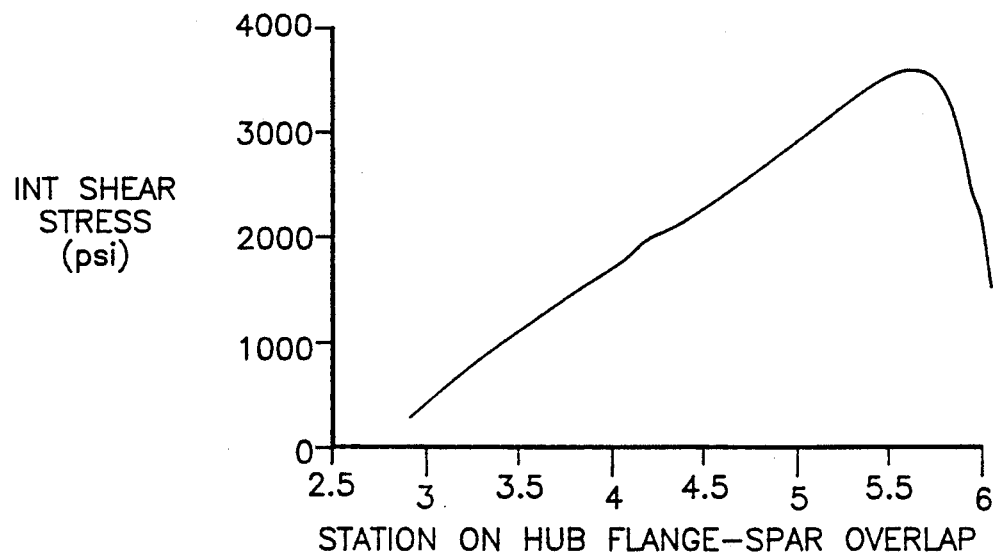
FIG. 5B is a graphic representation of the interlaminar shear stress created at the various stations along the overlap of the hub flange in the spar.

If the conventional practice for connecting pin location were followed, connecting bolts 22 would be positioned 1.5 times their diameter from the outboard edges of hub flanges 16 and 18. If we were to follow prior art teaching, bolts 22 would therefore be located precisely at the station of maximum prying reaction load depicted in FIG. 5a. As shown in FIG. 5B, our investigation showed that the internal shear stress created within the spar 20 due to this prying reaction very nearly mirrors the FIG. 5a graph of prying reaction load.

A second load path through joint 19 created by blade flapping motion results in a differential bending reaction in the joint, which will now be described by referring to FIG. 6.

Figure 6:
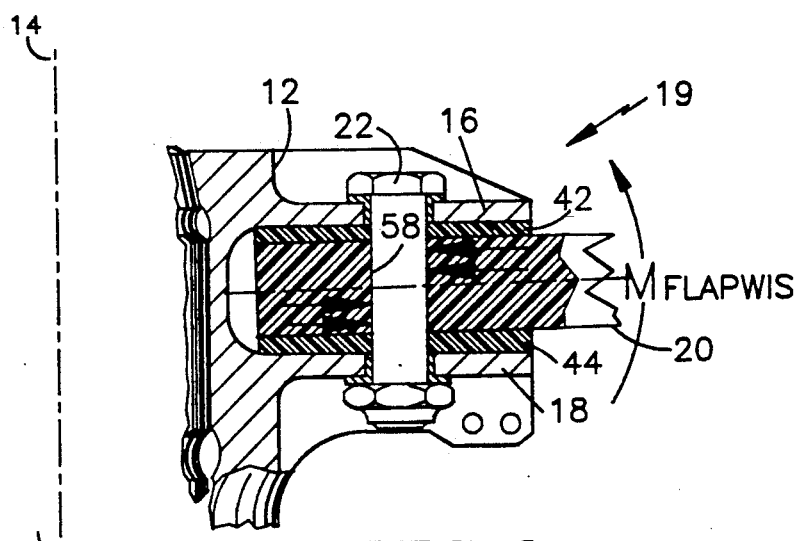
FIG. 6 is similar to FIG. 2 in that it is a showing through the connecting pin of our improved spar-to-hub joint and illustrates the differential bending reaction through the joint created by the blade flapping motion.

As best shown in FIG. 6, the blade flapping motion establishes a differential bending reaction between connecting bolt 22 and drilled hole 58 of spar 20, which creates loads depicted by arrows in the connecting bolt and in the spar which are maximum at the top and bottom surfaces of spar 20. This differential bending reaction can best be understood if we consider joint 19 to have a substantial gap between spar 20 and flanges 16 and 18 in the FIG. 6 construction. In such a construction, the entire flapping load must be reacted between bolt 22 and spar 20 in this differential bending reaction. This would result in minimum hub flange bending stresses, but would require maximum bolt diameter and would result in maximum bolt hole stresses. This also is obviously not an optimum design.

As stated earlier, it is an object of our invention to decouple the loads formed by the aforementioned prying reaction and the aforementioned differential bending reaction so that they are at substantially different stations along joint 19, thereby permitting use of a minimum thickness spar with resultant reduction in rotor size and weight, and a similar reduction in effective hinge or flapping axis offset.

To understand how our improved spar-to-hub joint 19 decouples the load created by the prying reaction and the differential bending reaction due to blade flapping, reference will now be made to FIGS. 7, 8 and 9.

FIG. 7, 8 and 9 depict spar 20 positioned between flanges 16 and 18 of hub 12 and with resilient pads 42 and 44 positioned therebetween and with connecting bolt 22 shown schematically as line 22.

Viewing FIG. 7, we see several important dimensions in our improved spar-to-hub joint 19, namely, $t_{FB}$—the thickness of spar 20, $t_N$—the thickness of pads 42 and 44, $L_B$—the distance of connecting bolt 22 spacing from the radially inner end of flanges 16 and 18, $L_F$—the length of clevis 38, $t_F$—the thickness of flanges 16 and 18, $L_N$—the length of pads 42 and 44, and D is the diameter of holes 58.

FIG. 8 shows diagrammatically the prying reaction between the spar and the hub created by blade flapping motion which is maximum at station 1. This prying reaction can be represented by the equation:

$$P_1 \simeq M_1/LC1 \qquad \text{Equation \#1}$$

where $M_1$ is the moment of the blade flapping motion caused by the prying reaction, LC1 is the length of pads 42 and 44 minus the spar thickness. Also, the critical stress $\tau_{max}$ at station 1 of FIG. 8 can be represented by the equation:

$$\tau_{(max-pry)} \simeq \frac{3M_1}{2(LC1)b(t_{FB})} \qquad \text{Equation \#2:}$$

where b is the spar member width.

FIG. 9 depicts the differential bending reaction at Station 2 caused by blade flapping motion. This reaction can be represented by the equation:

$$P_2 \simeq \frac{3M_2}{4t_{FB}} \qquad \text{Equation \#3:}$$

where $M_2$ is the moment of the blade flapping motion caused by differential reaction.

The critical stress $\sigma_{MAX}$ at Station 2 is:

$$\sigma_{(MAX-DB)} \simeq \frac{6M_2 K_T}{(b-2D)(t_{FB})^2} \qquad \text{Equation \#4:}$$

where $K_T$ is the stress concentration at the edge of the hole due to differential bending reaction.

In our preferred embodiment, in which we want 50% of the blade flapping induced loads to be carried by the prying reaction, and 50% to be carried by the differential bending reaction, in addition we would select these parameter so that the critical stress at station 1, $\tau_{MAX}$ was equal to its material allowable, and the critical stress at station 2 was equal to its material allowable:

$$\frac{\tau_{MAX}}{\tau_{ALLOWABLE}} \simeq \frac{\sigma_{MAX}}{\sigma_{ALLOWABLE}} \qquad \text{Equation \#5:}$$

We will now describe the manner in which our improved spar-to-hub connection 19 is designed to assure that the desired amount of decoupling of differential bending reaction and prying reaction due to blade flapping motion is achieved. We have selected for purposes of illustration what we consider to be the best mode, and that is one in which 50% of the flapping load is reacted by differential bending reaction and 50% is reacted by prying reaction. It will be evident that these percentages can vary depending upon the particular helicopter rotor involved.

Figure 9A:
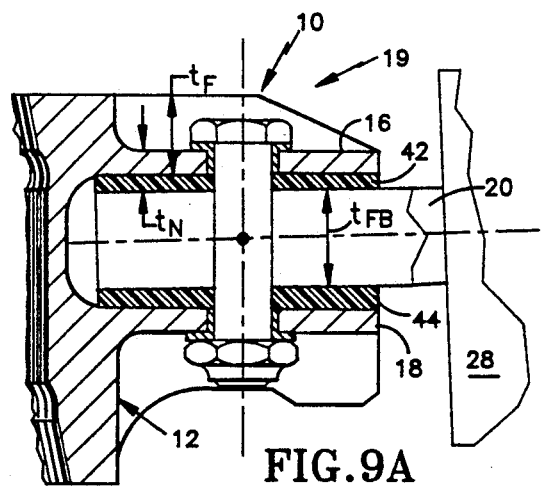
FIG. 9A is a cross-sectional showing of our improved connection corresponding to FIG. 9 and showing additional dimensions and parameters.
Figure 9B:
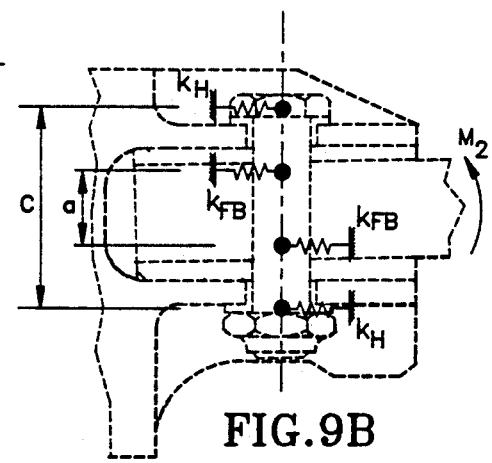
FIG. 9B is the equivalent mathematical (spring) model corresponding to the FIG. 9A construction.

We will first explain how differential bending across spar-to-hub joint 19 is determined by viewing FIGS. 7, 9, 9a and 9b which show joint or connection 19 with flexbeam member 20 positioned between hub flanges 16 and 18 and with resilient pads 42 and 44 sandwiched therebetween, and connected together through connecting bolts 22. While FIG. 9a shows the physical joint proper, FIG. 9b is an equivalent mathematical spring model which will be used to demonstrate how the differential bending stress of joint 19 is determined.

The parameters shown in FIGS. 9a and 9b are: $M_2$ equals the flapwise moment in inch-pounds, $K_H$ equals the hub flange stiffness in pounds per inch, $K_{FB}$ equals the flexbeam stiffness in pounds per inch, $t_F$ equals the hub flange thickness in inches, $t_N$ equals the resilient pad thickness in inches, $t_{FB}$ equals the flexbeam or spar member thickness in inches, a equals $3t_{FB}/4$, and c equals $t_{FB}+2t_N+t_F$.

We have determined that: Equation #6: $K_H = \pi t_F G_F$ ... er inch where $G_F$ is the shear modulus of the ... and Equation #7: $K_{FB} = [(t_{FB}/2)]G_{FB}$ in ... nch where $G_{FB}$ is the inplane shear modulus ... exbeam.

... these expressions, we have further determined for our FIG. 9a joint that the differential bending stiffness of spar-to-hub joint 19 can be expressed:

$$K_{DB} = \left| \frac{1}{\frac{1}{K_H c^2} + \frac{1}{K_{FB} a^2}} \right| \frac{\text{IN.-LB.}}{\text{Radian}} \qquad \text{Equation \#8:}$$

Figure 8A:
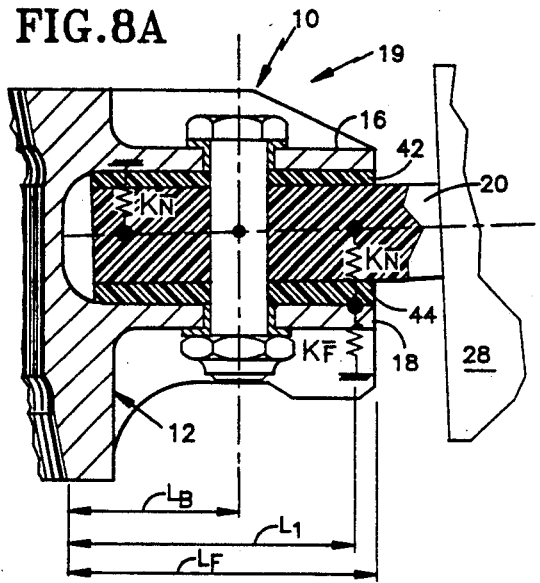
FIG. 8A is another schematic representation of a two-connecting pine, single-row embodiment of our improved joint to demonstrate additional parameters to be used in connection with the description of the operation and design thereof.
Figure 8B:
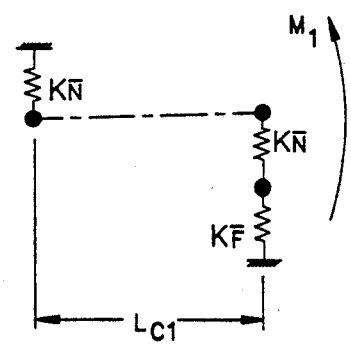
FIG. 8B is the equivalent mathematical (spring) model of the FIG. 8A embodiment.

Now viewing FIGS. 8A and 8B, we will demonstrate how we determine the prying reaction bending stiffness in joint 19. FIG. 8B is the equivalent mathematical spring model for the FIG. 8A joint. The parameters shown in FIGS. 8A and 8B are: $M_1$ equals the flapwise prying reaction moment in inch pounds, $L_F$ equals length of flange in inches, $L_1$ equals $L_F$ minus $(t_{FB}/2)$ in inches, LC1 equals $L_N$ minus $t_{FB}$ in inches $L_B$ equals location of bolt in inches, $K_n$ equals nylon pad stiffness in pounds/inch, $K_f$ equals hub flange stiffness in pounds/inch.

Using the model of FIG. 8B, we determined the prying reaction bending stiffness of Joint 19 to be:

$$K_n = \frac{t_{FB} b E_n}{t_N} \frac{\text{LB.}}{\text{IN.}} \qquad \text{Equation \#9:}$$

Where $E_n$ equals the resilient pad modulus in LB/IN².

$$K_F = \frac{b t_F^3 E_F}{4 L_1} \left[ \frac{1}{L_1^2 - \frac{L_B}{4}(3L_1 - L_B)} \right] \qquad \text{Equation \#10:}$$

Where $E_F$ is the hub flange modulus in LB/IN².

Using equations #9 and #10, we have developed a prying reaction bending stiffness $K_{pry}$ equal to:

$$K_{prying} = \left| \frac{LC1^2}{\frac{1}{K_F} + \frac{2}{K_N}} \right| \text{IN.-LB./RADIAN} \qquad \text{Equation \#11:}$$

In our preferred embodiment in which about 50% of the blade flapping load is to be reacted by differential bending, and about 50% by prying reaction, Equation #8 will be equal to Equation #11.

With the above equations in mind, we now return to the description of the manner in which spar-to-hub joint 19 is designed. Knowing the maximum blade/spar-to-hub load which rotor 10 is anticipated to experience, we first size flexbeam 20 at the connecting bolt 22 station shown along line 3—3 in FIG. 2 to be adequate to carry 100% of spar-to-hub centrifugal loading, and 100% of spar-to-hub lead-lag or chordwise loading, 50% of the flapping load reacted as differential bending, and 50% of the flapping load reacted as prying.

From equations #8 and #11, we next determine the differential bending and prying spring rates of the attachment 19, and determine the percent of the flapping load which is reacted by differential bending and the percent reacted by prying:

$$M_F^{DB} = \left[ \frac{K_{DB}}{K_{DB} + K_{pry}} \right] M_F \qquad \text{Equation \#12:}$$

$$M_F^{pry} = \left[ \frac{K_{pry}}{K_{DB} + K_{pry}} \right] M_F \qquad \text{Equation \#13:}$$

Again, in one preferred embodiment in which the blade flapping load is to be reacted substantially equally by prying reaction and differential bending reaction through connecting Joint 19, Equations #12 and #13 will be equal.

The critical stress from prying reaction occurring at point 1 in FIG. 2 of the flexbeam can be determined by:

$$\tau = \frac{2 M_F^{pry}}{2(LC1) b(t_{FB})} \qquad \text{Equation \#14:}$$

Where $\tau$ is the interlaminar shear stress in pounds per square inch.

The critical stress from differential bending occurs at the edge of the bolt hole in flexbeam 22 shown at point 2 in FIG. 2 and can be determined by:

$$\sigma = \frac{4M_F^{DB} K_T}{(b - 2D)(t_{FB})^2} \quad \text{Equation \#15:}$$

Where $\sigma$ is the bending stress in pounds per square inch, and $K_T$ is the stress concentration at spar hole 58.

Next, at point or Station 1 of the flexbeam we add the interlaminar shear stress psi determined from Equation #14 to the stress state from other loads at point or station 1 of FIG. 2 and compare to the material allowable. By this we mean, is there enough spar member or flexbeam material at station 1 to react this load?

Correspondingly, at point 2 of the flexbeam 20, we add the bending stress psi from Equation #15 to the stress state from other loadings at point 2 and compare this to the material available.

If the stress is more critical at point 1, i.e., $$\left[\frac{\tau_{ALLOWABLE}}{\tau_{MAX}}\right]_1 < \left[\frac{\sigma_{ALLOWABLE}}{\sigma_{MAX}}\right]_2$$

the flapwise reaction of prying is too stiff. Therefore, we must increase the thickness $t_N$ of the resilient pads 42 and 44 to reduce the prying reaction. While the prying reaction could also be reduced by possibly increasing the flexbeam thickness, reducing the hub flange thickness, or reducing the length LC1, these are not attractive remedies and therefore one of the advantages of our invention is the simplicity of effecting reduction of this prying reaction by merely increasing the thickness of the resilient pads 42 and 44.

If, in the alternative, the stress is more critical at point 2 of FIG. 2, the flapwise reaction of differential bending is too stiff. To reduce the differential bending reaction, we therefore reduce the thickness of resilient pads 42 and 44.

The preceding steps are then iterated until the critical stress at points 1 and 2 of FIG. 2 are equal to their material allowables.

Finally, we deem it advisable to check the critical stress points 1 and 2 in FIG. 2 to assure that they remain separated sufficiently to insure that the flapwise components of prying and differential bending have been decoupled adequately to insure the optimum attachment configuration.

The foregoing discussion was in the context of a spar-to-hub joint which employed two bolts 22 arranged in a single row at equal radii from the axis of rotation 14', however, if a redundant load path through the attachment is required for damage tolerance, an additional row of bolts may be provided. In such instance, the previous methodology can be extended to that configuration to produce an optimum spar-to-hub joint, however the configuration differences require modification of some of the parameters and the corresponding equations.

Figure 10:
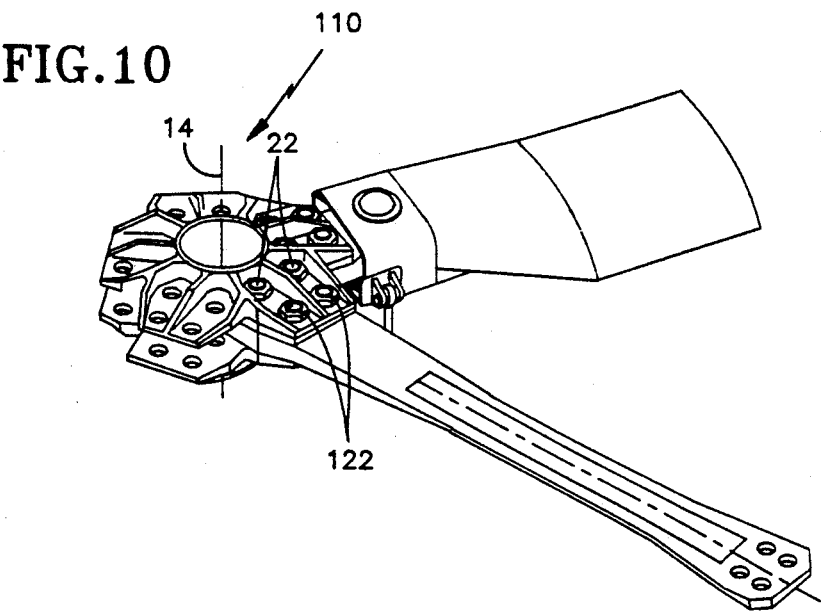
FIG. 10 is a perspective view of a part of a flexbeam rotor having two rows of connecting pins in another embodiment of the improved spar-to-hub connection.
Figure 11:
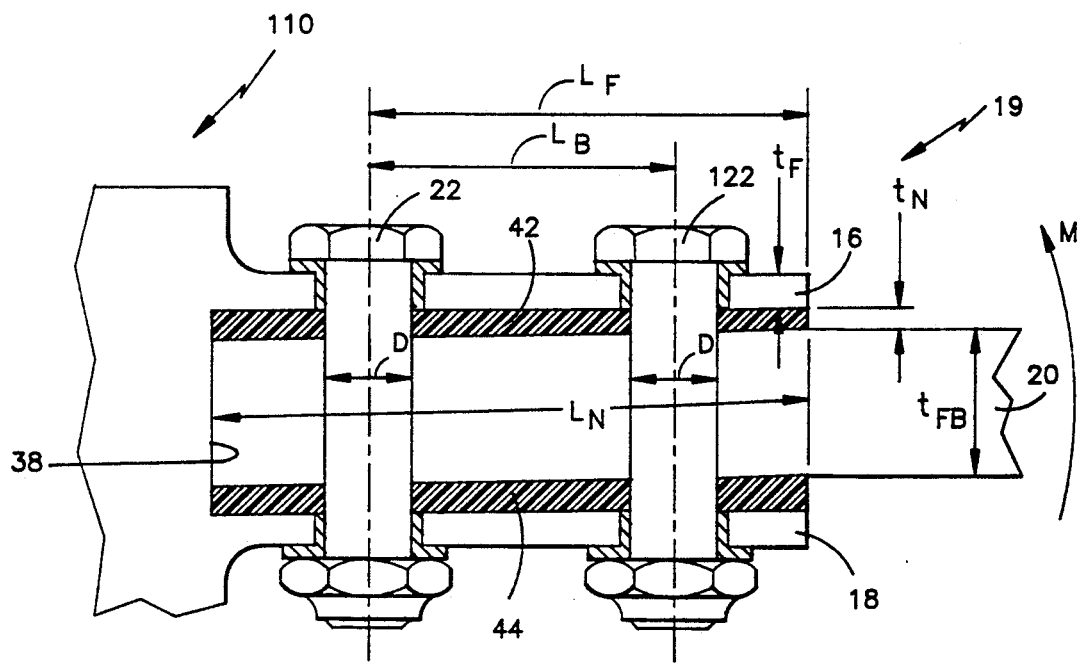
FIG. 11 is a schematic representation of the two-row connecting pin embodiment of the invention of FIG. 10, illustrating parameters and dimensions associated with that embodiment.

In the embodiment depicted in FIGS. 10 and 11, there are two rows of bolts 22 and 122, respectively in the rotor 110. In each row there are two bolts, though the following expressions are also applicable for three or more bolts per row. These expressions generally are limited to applicability with one and two-row configurations.

The schematic representation in FIG. 11 is the two-row counterpart to the one-row configuration depicted in FIG. 7 and the other figures associated with that embodiment. It will be noted that whereas the parameter $L_B$ in FIG. 7 was the distance of connecting bolt 22 from the root of clevis 38, in FIG. 11 that parameter is measured from the inner row of bolts 22 to the outer row of bolts 122. This is based on the observation and premise that the spar 20 is immovably anchored at the inner row of bolts 22 in about the same manner as provided by the root of the clevis 38. Additionally, whereas the parameter $L_F$ in FIG. 7 was the length of the clevis 38 from the root of flanges 16 and 18 to their outer ends, that parameter in the FIG. 11 embodiment represents the distance from the innermost row of bolts 22 to the outer ends of the flanges. The relation $$L_1 = L_F - \frac{t_{FB}}{2}$$

is applicable to both the one row and the two-row embodiments, but the $L_F$ parameter is measured differently in each.

The family of equations #1 through #13 previously expressed with respect to the one-row embodiment of FIGS. 1 through 9B are generally applicable also to the two-row embodiment of FIGS. 10–11, subject to generalizing modifications to equations #4, #6 and #7 to provide:

$$\sigma_{(MAX-DB)} = \frac{6M_2 K_T}{(b - N_{BR}D)(t_{FB})^2} \quad \text{Equation \#4':}$$

$$K_H = N_R \pi\, t_F G_F \quad \text{Equation \#6':}$$

and $$K_{FB} = N_R \pi \left|\frac{t_{FB}}{2}\right| G_{FB} \quad \text{Equation \#7:}$$

wherein $N_{BR}$ = the number of bolts/row, and
$N_R$ = the number of rows of bolts (either 1 or 2).

As previously described, it is preferred that the blade flapping load be reacted substantially equally by prying reaction and differential bending reaction through the connecting joint. The generalized equation for either the one-row or two-row embodiment which represents an approximate balancing of these two reactions is expressed by:

$$(L_N - t_{FB}) = \frac{t_{FB}(b - N_{BR}D) E_{FB}}{2 K_T b G_{IFB}}$$

where the length of the resilient pads is $L_N$, the width of the spar member is b, the thickness of the spar member is $t_{FB}$, the diameter of the spar holes is D, $G_{IFB}$ represents the interlaminar shear modulus, $E_{FB}$ is the Young's modulus of the flexbeam and $K_T$ is the stress concentration at the edge of the radially outermost hole(s) due to differential bending reaction.

We claim:

1. A helicopter rotor of the flexbeam rotor variety including:
   a. a hub member adapted to be mounted for rotation about an axis of rotation and having vertically spaced peripheral flanges forming a clevis with the hub member;
   b. an elongated, flexible, one-piece radially extending spar member comprised of a plurality of parallelly extending, high tensile strength fibers bonded together to form said spar member to be rectangular in cross section of selected width and thickness and having top and bottom surfaces, and having a pitch change axis about which the spar is torsionally flexible, and also having an effective flapping axis offset from said axis of rotation;

c. aligned holes in said hub peripheral flanges and said spar member radially inner end;

d. connecting bolts extending through said aligned holes to connect said spar member to said hub member for rotation therewith about the said axis of rotation;

e. a blade member connected to the radially outer end of said spar member for rotation therewith about said axis of rotation, and pitch change motion therewith about said pitch change axis, and for lead-lag motion, and for flapping motion therewith about said flapping axis;

f. wherein centrifugal blade loads created during rotation about said axis of rotation and lead-lag motion loads are reacted by said connecting bolts and said spar member and hub flanges at said aligned holes, and wherein loads created by blade flapping motion are reacted both by:

(1) a prying reaction between said spar member and said hub member flanges that creates loads in the spar member and the hub member which are maximum near the outer edge of the hub flanges and near the inner end of the spar; and (2) a differential bending reaction between the spar member and the connecting bolts that creates loads in the spar member and the hub member at said aligned holes, and in said connecting bolts that are maximum at the interface between said connecting bolts and said spar member at the vertical top and bottom ends of said spar member holes; and g. means coacting with said spar members and said hub flanges to decouple the loads created by said prying reaction and said differential bending reaction so that they are in substantially spaced relationship along the stations of spar and flange overlap to reduce said maximum loads, to thereby use of a minimum thickness spar member thereby reduce the weight and size of the helicopter rotor, and to achieve minimum offset of said flapping axis from said axis of rotation.

2. A helicopter rotor according to claim 1 wherein said decoupling means comprises resilient pads of selected tensile and compressive modulus of about 500,000 psi positioned between said spar top and bottom surfaces and said hub peripheral flanges.

3. A helicopter rotor according to claim 2 wherein said resilient pads are made of Nylon.

4. A helicopter rotor according to claim 2 wherein said spar member holes are drilled for ease of manufacture.

5. A helicopter rotor according to claim 2 wherein the length of the resilient pads is $L_N$, the width of the spar member is b, the thickness of the spar member is $t_{FB}$, and the diameter of the spare holes is D, where $G_{IFB}$ is the interlaminar shear modules, $E_{FB}$ is the Young's modulus of the flexbeam, $K_T$ is the stress concentration at the edge of the hole due to differential bending reaction, and wherein the prying reaction and the differential bending reaction between the spar member and the hub member flanges are substantially equal and the following relationship if satisfied:

$$(L_N - t_{FB}) = \frac{t_{FB}(b - 2D)E_{FB}}{2K_T b G_{IFB}}$$

6. A helicopter rotor according to claim 2 wherein said hub member peripheral flanges, said spar member, said connecting bolts and said resilient pads perform a joint connection between said hub and said spar, and wherein these parts are dimensioned and of selected material so that the differential bending stiffness and the prying reaction bending stiffness of the joint are substantially equal.

7. A helicopter rotor according to claim 6 wherein the differential bending reaction spring rate and the prying reaction spring rate of said connecting joint are substantially equal.

8. A helicopter rotor according to claim 2 wherein said hub member flanges, spar member, and resilient pads and connecting bolts form a hub-to-spar joint connection, and wherein the blade flapping motion loads transmitted from said spar hub through said joint are reacted both by a prying reaction between said spar and said flanges and a differential bending reaction between said connecting bolt and said spar holes to form two decoupled load carrying paths, and wherein the thickness of said resilient pads is selected to control the amount of decoupling between said load paths formed by said prying reaction and load path formed by differential bending reaction.

9. A helicopter rotor according to claim 2 wherein said hub member flanges, spar member, and resilient pads and connecting bolts form a hub-to-spar joint connection, and wherein the blade flapping motion loads transmitted from said spar hub through said joint are reacted both by a prying reaction between said spar and said flanges and a differential bending reaction between said connecting bolt and said spar holes to form two decoupled load carrying paths, and wherein the thickness of at least one of said resilient pads is selected to control the loads being carried through said load paths.

10. A helicopter rotor according to claim 2 wherein said hub member flanges, spar member, and resilient pads and connecting bolts form a hub-to-spar joint connection, and wherein the blade flapping motion loads transmitted from said spar hub through said joint are reacted both by a prying reaction between said spar and said flanges and a differential bending reaction between said connecting bolt and said spar holes to form two separated or decoupled load carrying paths, and wherein the thickness of at least one of said resilient pads is selected to control the amount of decoupling between said load paths formed by said prying reaction and load paths formed by differential bending reaction, and also the loads being carried through said load paths.

11. A helicopter rotor according to claim 1 wherein said decoupling means comprises resilient pads positioned between said spar top and bottom surfaces and said hub peripheral flanges, the length of the resilient pads is $L_N$, the width of the spar member is b, the thickness of the spar member is $t_{FB}$, and the diameter of the spare holes is D, where $G_{IFB}$ is the interlaminar shear modules, $E_{FB}$ is the Young's modulus of the flexbeam, $K_T$ is the stress concentration at the edge of the radially outermost hole due to differential bending reaction, and wherein the prying reaction and the differential bending reaction between the spar member and the hub member flanges are substantially equal and the following relationship if satisfied:

$$(L_N - t_{FB}) = \frac{t_{FB}(b - N_{BR}D)E_{FB}}{2K_T b G_{IFB}}$$

12. A helicopter rotor according to claim 11 wherein said resilient pads are of selected tensile and compressive modulus of about 500,000 psi.

13. In a flexbeam helicopter rotor having a torsionally compliant spar member connected to spaced peripheral hub flanges by means of one or more connecting bolts and having resilient pads positioned between the spar member and the peripheral flanges and in which the blade flapping loads are reacted by a differential bending reaction at the connecting bolts and a prying reaction between the spar and the hub flanges, the method of fabricating such a spar member-to-hub flange connection comprising:

a. sizing the connecting bolt and the cross section of the spar through which the connecting bolt passes to be sufficient to handle 100% of the blade centrifugal loading, 100% of the blade lead-lag loading, about 50% of the blade flapwise loading reacted as differential bending at the connecting bolts, and 50% of the flapwise load reacted as prying reaction between the spar member and the hub flanges which results in a maximum interlaminer spar shear station in the spar member;

b. mathematically determining the percent of the flapwise blade loading that is reacted by differential loading at the connecting bolts and the percent reacted by prying reaction between the spar member and the hub flanges;

c. mathematically determining the maximum interlaminar shear stress caused by said prying reaction, and the maximum bending stress caused by said differential bending reaction and add those load requirement to the load requirements determined in step a.;

d. comparing those load requirements with the load carrying capability of the materials available in the spar and the hub flanges;

e. if the load to be carried at the point of maximum interlaminar shear stress is more critical than the load to be carried at the connecting bolts due to differential bending, increasing the thickness of the resilient pad to reduce the maximum interlaminar shear stress loading or, if the loading at the connecting bolts caused by the aforementioned maximum differential bending stress is the more critical, reducing the thickness of the resilient pads; and f. iterating the preceding steps until the critical stress at the connecting bolts and at the point of maximum interlaminar shear stress in the spar are equal to the strength of the material available at those stations.

14. The method according to claim 15 including the additional step of determining that the maximum interlaminar shear stress is spaced along the spar at least one full spar thickness from the connecting bolts to assure that decoupling has been achieved between the prying reaction loads and the differential bending reaction loads created by blade flapping.

* * * * *

UNITED STATES PATENT AND TRADEMARK OFFICE
CERTIFICATE OF CORRECTION

PATENT NO. : 5,286,167

DATED : February 15, 1994

INVENTOR(S) : Francis E. Byrnes, et al

It is certified that error appears in the above-identified patent and that said Letters Patent is hereby corrected as shown below:

Column 2, line 67, "pine" should read "pin"

Claim 1, column 10, line 63, "f or" should read "for"

Claim 5, column 11, line 63, "spare" should read "spar"

Claim 9, column 12, line 39, following "spar" insert --to said--

Claim 10, column 12, line 52, following "spar" insert --to said--

Claim 14, column 14, line 31, "15" should read "13"

Signed and Sealed this

Fifth Day of July, 1994

Attest:

BRUCE LEHMAN

*Attesting Officer*     *Commissioner of Patents and Trademarks*